(12) United States Patent
Søndergaard et al.

(10) Patent No.: US 8,737,657 B2
(45) Date of Patent: May 27, 2014

(54) SUSPENSION FOR A HEARING DEVICE RECEIVER, AND A METHOD OF PRODUCING A HEARING DEVICE, AND A HEARING DEVICE

(75) Inventors: Morten Birkmose Søndergaard, Hillerød (DK); Jan Johansen, Køge (DK)

(73) Assignee: GN Resound A/S, Ballerup (DK)

( * ) Notice: Subject to any disclaimer, the term of this patent is extended or adjusted under 35 U.S.C. 154(b) by 337 days.

(21) Appl. No.: 12/944,520

(22) Filed: Nov. 11, 2010

(65) Prior Publication Data

US 2012/0121116 A1    May 17, 2012

(51) Int. Cl.
    *H04R 25/00*    (2006.01)
(52) U.S. Cl.
    USPC ........... 381/322; 381/328; 381/353; 381/354; 381/368
(58) Field of Classification Search
    None
    See application file for complete search history.

(56) References Cited

U.S. PATENT DOCUMENTS

| | | | | |
|---|---|---|---|---|
| 3,527,901 | A * | 9/1970 | Geib | 381/328 |
| 4,440,982 | A * | 4/1984 | Kaanders et al. | 381/322 |
| 4,870,688 | A * | 9/1989 | Voroba et al. | 381/60 |
| 7,403,629 | B1 | 7/2008 | Aceti et al. | |
| 2006/0153411 | A1 * | 7/2006 | Mehr | 381/339 |
| 2008/0002848 | A1 * | 1/2008 | Heerlein et al. | 381/328 |
| 2008/0317269 | A1 * | 12/2008 | Tipsmark et al. | 381/322 |
| 2008/0317272 | A1 * | 12/2008 | Ho et al. | 381/330 |

FOREIGN PATENT DOCUMENTS

| | | |
|---|---|---|
| WO | 0143498 | 6/2001 |
| WO | 2004008803 | 1/2004 |
| WO | 2005055653 | 6/2005 |
| WO | 2007011421 | 1/2007 |

OTHER PUBLICATIONS

European Search Report dated Feb. 25, 2011 for EP Application No. 10190874.7.
First European Office Action dated Mar. 15, 2013 for EP Patent Application No. 10 190 874.7, 5 pages.

* cited by examiner

*Primary Examiner* — Duc Nguyen
*Assistant Examiner* — Taunya McCarty
(74) *Attorney, Agent, or Firm* — Vista IP Law Group, LLP

(57) ABSTRACT

A suspension for a hearing device having a receiver includes a first part, a second part, and a vibration isolator positioned between the first and the second parts, and mechanically coupled to the first and second parts, wherein the first part is configured to at least partly enclose the receiver, wherein the second part is configured to at least partly enclose a sound outlet of the hearing device, wherein the vibration isolator comprises an acoustic passage part and a damping part enclosing the acoustic passage, wherein the acoustic passage part provides an acoustic passage between the first and second parts, wherein the damping part of the vibration isolator is asymmetrical along a longitudinal, a transverse axis, or both the longitudinal axis and the transverse axis, of the vibration isolator, and wherein the vibration isolator is freely suspended between the first and second parts.

19 Claims, 5 Drawing Sheets

SUSPENSION FOR A HEARING DEVICE RECEIVER, AND A METHOD OF PRODUCING A HEARING DEVICE, AND A HEARING DEVICE

FIELD

The present specification relates to a suspension for a hearing device receiver and to a method for producing a hearing aid with such a suspension. Additionally, the present specification relates to a hearing device comprising such a suspension.

BACKGROUND

A hearing device comprises a microphone which receives acoustic signals. The received acoustic signals are processed where the processing may include amplification of the data. The processed signals are transmitted to a receiver of the hearing device which converts the processed signals into another acoustic signal e.g. with a larger amplitude at certain frequencies. The receiver broadcasts the other acoustic signal towards the tympanic membrane of a user of the hearing device.

The broadcasting of the other acoustic signal can cause the receiver and the hearing device to vibrate which vibrations may be transmitted back to the microphone resulting in an unwanted feedback loop thereby putting a limitation on the amplification which the hearing device may deliver to the user.

Therefore, Applicant of the subject application determines that it would be advantageous to reduce the transmission of vibrations generated by the receiver to the rest of the hearing device.

SUMMARY

It is an object to provide a suspension for a hearing device receiver with an improved vibration reduction. The above-mentioned and other objects are fulfilled by a suspension for a hearing device receiver comprising a first part and a second part and a vibration isolator positioned between the first and the second parts and mechanically coupled to the first and second parts; wherein the first part is adapted to at least partly enclose the receiver; and the second part is adapted to at least partly enclose a sound outlet of the hearing device; and wherein the vibration isolator comprises an acoustic passage and a damping part enclosing said acoustic passage; and wherein the acoustic passage part provides an acoustic passages between the first and second parts; and wherein the damping part of the vibration isolator is asymmetrical along a longitudinal and/or a transverse axis of the vibration isolator; and wherein the vibration isolator is freely suspended between the first and second parts.

In some embodiments, a suspension with a part (vibration isolator) can move freely between the receiver and the sound outlet, thus ensuring that vibration energy may be dispersed in a direction away from the housing i.e., in one or more of the free moving directions. Thus, the vibration energy is reduced to the housing from the receiver.

In some embodiments, a material thickness of the damping part varying along the longitudinal and/or the transverse axis of the vibration isolator provides the asymmetry of the damping part.

In some embodiments, the asymmetry of the vibration isolator is constructed by varying the thickness of the damping part. This ensures that parts of the vibration isolator comprising relatively thick walls are stiffer than parts comprising relatively thin walls.

In some embodiments, the damping part further comprises a flexible part and a substantially rigid part positioned substantially intermediary between the first and second parts, wherein the flexible part is more flexible than the substantially rigid part.

In some embodiments, the suspension is configured to change the vibration pattern of the suspension and the receiver such that the vibrations from the receiver are reduced to the housing and/or the sound outlet, but instead the vibration energy is dispersed in the free moving motion of the vibration isolator.

In some embodiments, the flexible part is positioned between the second part and the substantially rigid part.

In some embodiments, the vibrations are dispersed in the substantially rigid damping part and the flexible part dampens further vibrations.

In some embodiments, the first and the second parts and the vibration isolator are molded in one piece.

In some embodiments, substantial optimal mechanical coupling between the first and second parts and the vibration isolator is obtained and thus, acoustic leakage between the parts may be eliminated.

In some embodiments, the first and the second parts and the vibration isolator are molded in an elastic material.

Thereby, the material of the suspension enables absorption of vibration energy in addition to the dispersion of the vibration energy due to the free movement of the vibration isolator.

In some embodiments, the damping part is asymmetric in at least two planes. Thereby, the suspension is able to disperse the vibration energy in the asymmetric planes.

In some embodiments, the damping part is asymmetric in two planes and symmetrical in a third plane. Thereby, the suspension is able to disperse the vibration energy in the asymmetric planes.

In some embodiments, the asymmetric planes are the X-Z plane and the Y-Z plane, and the symmetric plane is the X-Y plane. Thereby, the suspension is able to disperse the vibration energy in the asymmetric planes.

In some embodiments, the flexible part comprises a transverse material thickness smaller than the substantially rigid part.

In some embodiments, the flexibility of the flexible part is obtained by decreasing the wall thickness with respect to the wall thickness of the substantially rigid part.

In some embodiments, a material thickness of the damping part varies asymmetrically along the longitudinal and/or transverse axis of the vibration isolator.

In some embodiments, the suspension is able to disperse the vibration energy in the asymmetric planes.

In some embodiments, the material thickness of the flexible part is smaller than the material thickness of the substantially rigid part.

In some embodiments, the suspension is able to disperse the vibration energy in the asymmetric planes.

In some embodiment, the acoustic passage part comprises a tubular structure, and wherein a first transverse dimension of the tubular structure in proximity to the first part is smaller than a second transverse dimension of the tubular structure in proximity to the second part such that the tubular structure ensures sufficient contact between the suspension and the receiver.

In some embodiments, the acoustic passage part is configured to fit tightly around the snout of the receiver thereby reducing the risk of leaks from the receiver through the acoustic passage.

In accordance with some embodiments, a method of producing a hearing device comprising a receiver and a sound outlet and a suspension, the suspension comprising a first part and a second part and a vibration isolator positioned between and mechanically coupled to the first and second parts; the vibration isolator comprising a damping part enclosing an acoustic passage; the method includes: coupling mechanically the first part to the receiver; and coupling mechanically the second part to the sound outlet; such that the suspension provides an acoustic passage between the receiver and the sound outlet; and providing the damping part of the vibration isolator asymmetrically along a longitudinal and/or a transverse axis of the vibration isolator; and suspending the vibration isolator freely between the first and the second parts.

The method and embodiments thereof has the same advantages as the suspension for the same reasons.

In accordance with other embodiments, a hearing device includes a receiver and a sound outlet and a suspension, wherein the receiver is mechanically coupled to the first part of the suspension and the sound outlet is mechanically coupled to the second part of the suspension.

The hearing device and embodiments thereof has the same advantages as the suspension for the same reasons.

In accordance with some embodiments, a suspension for a hearing device having a receiver includes a first part, a second part, and a vibration isolator positioned between the first and the second parts, and mechanically coupled to the first and second parts, wherein the first part is configured to at least partly enclose the receiver, wherein the second part is configured to at least partly enclose a sound outlet of the hearing device, wherein the vibration isolator comprises an acoustic passage part and a damping part enclosing the acoustic passage, wherein the acoustic passage part provides an acoustic passage between the first and second parts, wherein the damping part of the vibration isolator is asymmetrical along a longitudinal, a transverse axis, or both the longitudinal axis and the transverse axis, of the vibration isolator, and wherein the vibration isolator is freely suspended between the first and second parts.

In accordance with other embodiments, a method of producing a hearing device having a receiver, a sound outlet, and a suspension, the suspension having a first part, a second part, and a vibration isolator positioned between and mechanically coupled to the first and second parts, the vibration isolator having a damping part enclosing an acoustic passage, the method includes coupling mechanically the first part to the receiver, coupling mechanically the second part to the sound outlet, providing the damping part of the vibration isolator asymmetrically along a longitudinal axis, along a transverse axis, or along both the longitudinal axis and the transverse axis, of the vibration isolator, and suspending the vibration isolator freely between the first and the second parts, wherein the acts of coupling are performed such that the suspension provides an acoustic passage between the receiver and the sound outlet.

Other and further aspects and features will be evident from reading the following detailed description of the embodiments, which are intended to illustrate, not limit, the invention.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
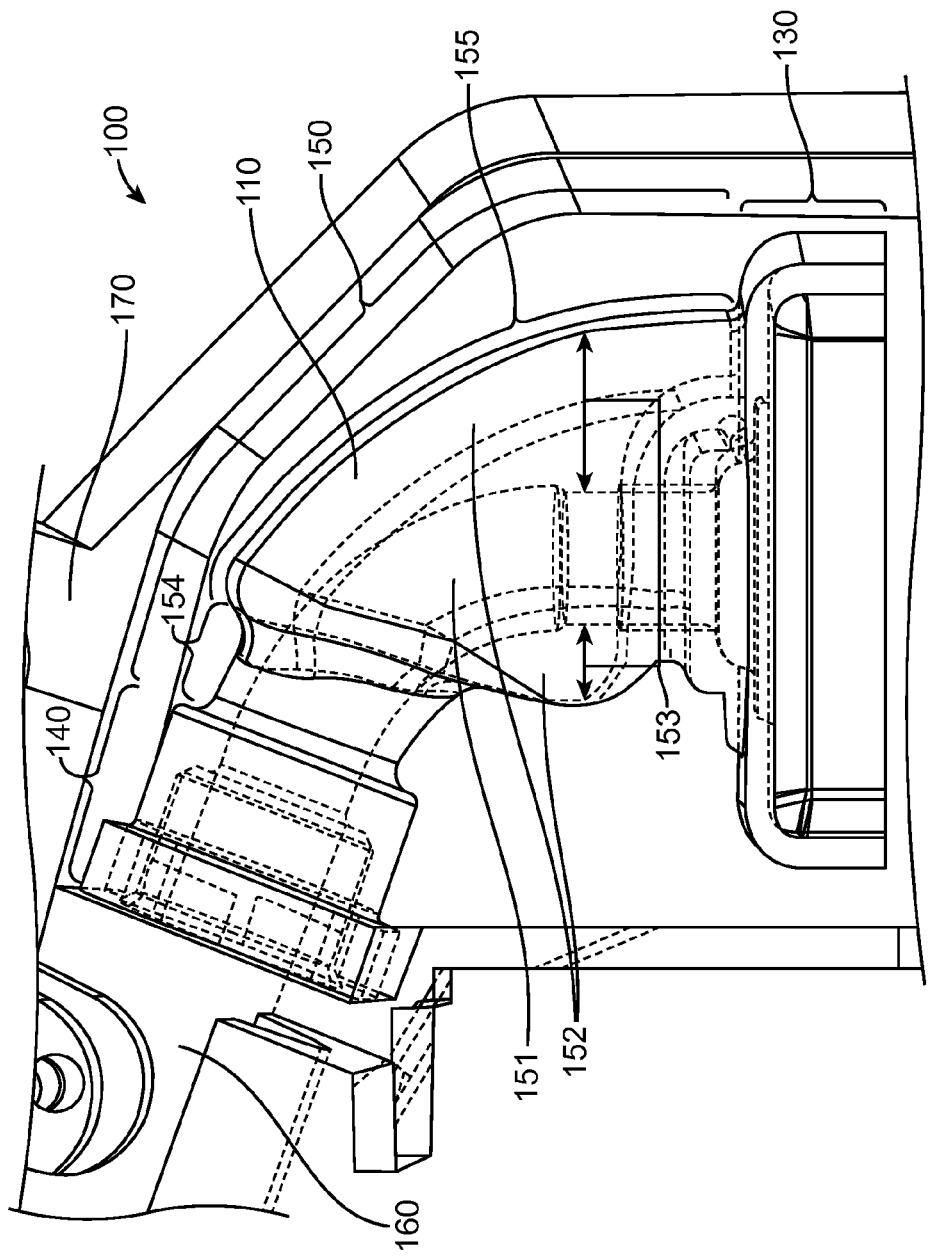
FIG. 1 shows a part of a hearing device comprising a suspension for a receiver of the hearing device.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

In the above and below, a hearing device may be selected from the group consisting of a hearing aid, a hearing prosthesis, and the like. Examples of a hearing device may include a behind the ear (BTE) hearing aid and a in the ear (ITE) hearing aid.

FIG. 1 shows a part of a hearing device 100 comprising a suspension 110 for a receiver 120 of the hearing device 100. The hearing device further comprises a sound outlet 160. The receiver 120 and/or the suspension 110 and/or the sound outlet 160 may be contained in a housing 170 of the hearing device 100. In an embodiment, the receiver 120 and the suspension and the sound outlet 160 are contained in the housing 170.

The suspension comprises a first part 130 and a second part 140 and a vibration isolator 150 positioned between the first 130 and the second 140 parts. The vibration isolator 150 may be mechanically coupled to the first 130 and second parts 140.

In an embodiment, the mechanical coupling between the vibration isolator 150 and the first 130 and the second 140 parts is provided by molding the vibration isolator 150 and the first 130 and the second 140 parts in one piece.

In an embodiment, the mechanical coupling between the vibration isolator 150 and the first 130 and the second 140 parts may be chosen from the group consisting of vulcanizing, and casting, and injection molding.

In an embodiment, the mechanical coupling between the vibration isolator 150 and the first 130 and the second 140 parts is made by molding such as heat sealing or the like.

In an embodiment, the first 130 and the second 140 parts and the vibration isolator 150 may be molded in an identical type of material such as an elastic material such as a rubber or silicone rubber or the like.

In an embodiment, the first 130 and the second 140 parts and the vibration isolator 150 may be molded in different materials. In an embodiment, the vibration isolator 150 may be molded in a first material with a first elasticity and the first 130 and second 140 parts may be molded in a second material with a second elasticity. In an embodiment, the second elasticity is smaller than the first elasticity.

Figure 2:
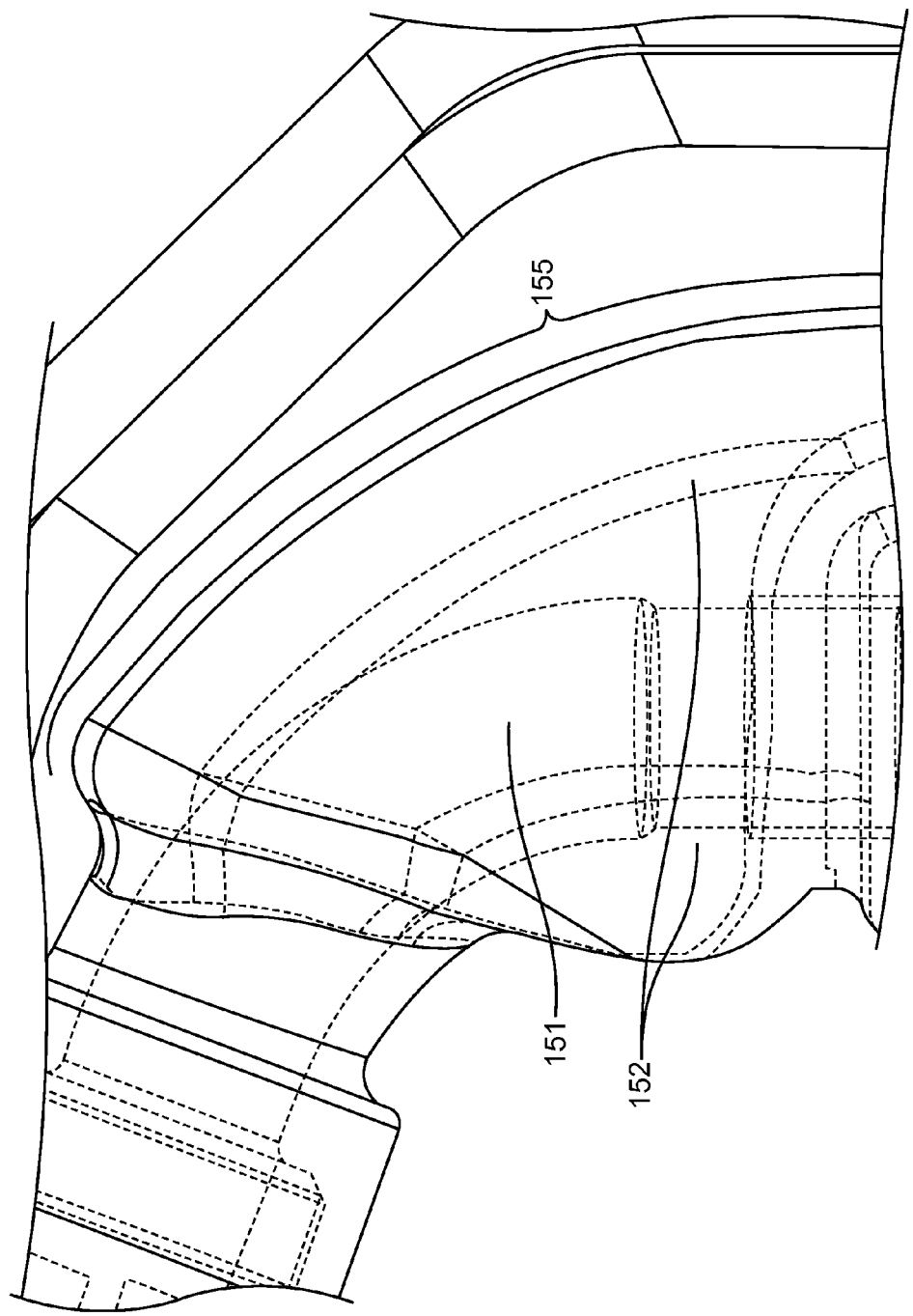
FIG. 2 shows a zoom of the vibration isolator.

FIG. 2 shows a zoom of the vibration isolator 150. The vibration isolator 150 comprises an acoustic passage 151 and a damping 152 part enclosing said acoustic passage 151.

The acoustic passage 151 provides an acoustic passage between the first 130 and second parts 140. In an embodiment, the acoustic passage 151 is hollow and substantially tubular such as to enable sound to travel from the first part 130 to the second part 140. The acoustic passage may in another embodiment have a shape different from substantially tubular such as for example a tubular shape with a rectangular cross section. In an embodiment, the acoustic passage 151 may have a cylindrical shape.

In an embodiment, a transverse dimension of the acoustic passage 151 in proximity to the first part 130 is smaller than the transverse dimension of the acoustic passage 151 in proximity to the second part 140. For example, the diameter of a cylindrical shaped acoustic passage may be smaller in proximity to the first part 130 than the diameter of the cylindrical shaped acoustic passage in proximity to the second part 140.

In an embodiment, the transverse dimension of a tubular or substantially tubular acoustic passage 151 in proximity to the first part 130 is smaller than the external diameter of a tubular or substantially tubular snout of the receiver 120. Thereby, the tubular or substantially tubular acoustic passage 151 ensures sufficient contact between the suspension 110 and the receiver 120 by being tight fitted around the snout of the receiver 120.

In an embodiment, the transverse dimension of a tubular or substantially tubular acoustic passage 151 in proximity to the second part 140 is equal to or substantially equal to (e.g. within 5%) the inner diameter of the sound outlet 160.

The damping 152 part of the vibration isolator 150 is asymmetrical along a longitudinal and/or a transverse axis of the vibration isolator 150. Reference 153 denotes a wall thickness of the vibration isolator 150.

In an embodiment, the wall thickness 153 of the damping 152 part varies along the longitudinal and/or the transverse axis of the vibration isolator 150 and thereby provides the asymmetry of the damping 152 part. Thus, a material thickness of the damping 152 part varies along the longitudinal and/or the transverse axis of the vibration isolator 150.

In an embodiment, a Cartesian coordinate system is used to define a number of planes in the drawings such as an X-Y plane, a X-Z plane and a Y-Z plane.

In an embodiment, the wall thickness 153 of the damping 152 part is asymmetrical in the X-Z plane and the Y-Z plane of FIG. 1.

In an additional embodiment, the wall thickness 153 of the damping 152 part is symmetrical in the X-Y plane of FIG. 1.

In an embodiment, the damping part 152 further comprises a flexible 154 part and a substantially rigid 155 part. The substantially rigid part is positioned substantially intermediary between the first 130 and second 140 parts. The flexible 154 part is positioned between the second part 140 and the substantially rigid 155 part.

In an embodiment, the flexible 154 part is more flexible than the substantially rigid 155 part i.e. the flexible 154 part has a larger elasticity than the substantially rigid 155 part. This may be achieved by molding the flexible 154 part in a more elastic material than the substantially rigid 155 part. Alternatively or additionally, it may be achieved by molding the flexible 154 part with a smaller wall thickness 153 than the wall thickness 153 of the substantially rigid 155 part i.e. the material thickness of the flexible 154 part is smaller than the material thickness of the substantially rigid 155 part.

In an embodiment, the wall thickness of the substantially rigid part 155 is at least 3 times thicker than the smallest wall thickness of the flexible part 154.

The flexible 154 and substantially rigid 155 parts ensures that the vibration pattern of the suspension is changed such that vibrations generated by the receiver 120 are directed in a direction away from the sound outlet 160 and substantially in one or more directions. Thereby, vibrations from the receiver 120 will be dampened and not propagate further in the hearing device 100 than to the vibration isolator.

The vibration isolator 150 is freely suspended between the first 130 and second 140 parts of the suspension 110 i.e. the vibration isolator 150 is mechanically coupled to the hearing aid 100 by the first part 130 being mechanically coupled to the receiver 120 and the second part 140 being mechanically coupled to the sound outlet 160. Thereby, the vibration isolator 150 is able to move/vibrate freely in the three planes illustrated in FIG. 1 i.e. in the X-Y plane and the X-Z plane and the Y-Z plane.

The substantially rigid 155 part of the damping part 150 is in an embodiment mechanically coupled directly to the first part 130 in order to ensure a stiff connection between the substantially rigid 155 part and the first part 130.

Figure 3:
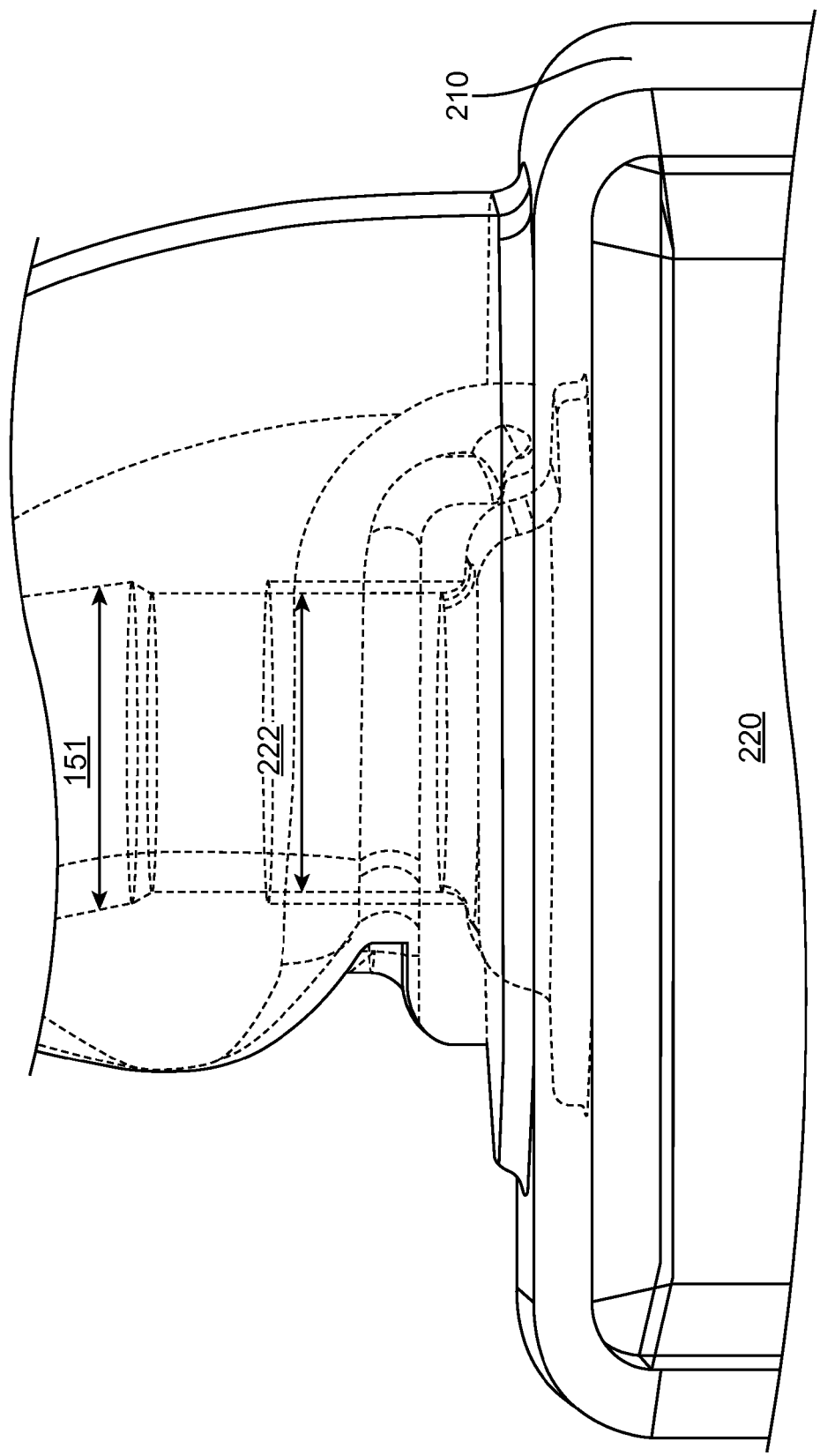
FIG. 3 shows a zoom of the first part.

FIG. 3 shows a zoom of the first part 130. The first part 130 is adapted to enclose at least a part of the receiver 120. The first part 130 may comprise a rectangular part 210 adapted to enclose at least a part of the receiver body 220.

In an embodiment, an inner cross section of the rectangular part 210 is equal to or substantially equal to (e.g. 5% less than or 2% less than) an outer cross section of the enclosed part of the receiver body 220 in order to ensure sufficient physical contact between the rectangular part 210 and the receiver body 220. Thereby is achieved that the receiver is in physical contact with the first part 130 by a gripping force between the first part 130 and the receiver 120.

In an additional or alternative embodiment, an inner cross section of the acoustic passage 151 enclosing at least a part of a snout 222 of the receiver 120 is equal to or substantially equal to (e.g. 5% less than or 2% less than) an outer cross section of the enclosed part of the snout 222 in order to ensure sufficient physical contact between the acoustic passage 151 and the enclosed part of the snout 222. Thereby is achieved that the snout 222 is in physical contact with the acoustic passage 151 via a gripping force between the snout 222 and the acoustic passage 151.

Figure 4:
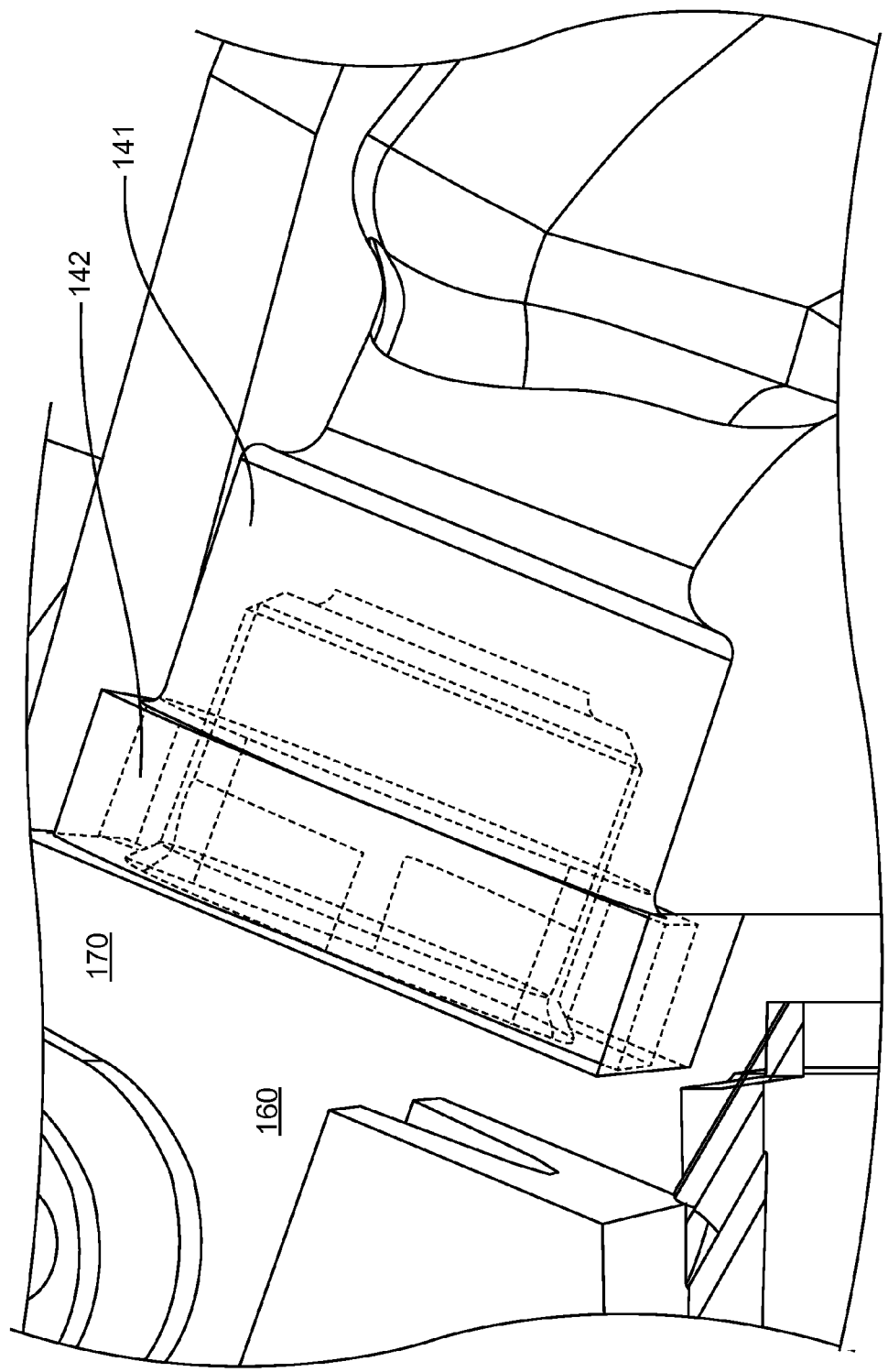
FIG. 4 shows a zoom of the second part.

FIG. 4 shows a zoom of the second part 140. The second part 140 is adapted to enclose at least a part of the sound outlet 160. The second part may comprise a tubular part 141 such as a cylindrical part and a rectangular part 142 such as a square part. The rectangular part 142 ensures sufficient abutment between the rectangular part 142 and the housing 170. Both the tubular part 141 and the square part 142 comprises an inner cross section matching or substantially matching (e.g. 5% less than) the outer cross section of the sound outlet 160 in order to ensure sufficient physical contact between the tubular part 141 and the square part 142 and the sound outlet 160. In an embodiment, the sound outlet 160 comprises a cylindrical outer cross section and thus, the inner cross section of the tubular part 141 and the rectangular part 142 are cylindrical thereby enabling reception of the sound outlet 160.

The tubular part 141 and the rectangular part 142 may be molded in one piece or may be molded in two pieces and mechanically coupled together by e.g. welding.

The first 130 and second 140 parts ensures a secure fastening of the suspension 110 to the housing 170 of the hearing aid 100 via the receiver 120 and the sound outlet 160.

Figure 5:
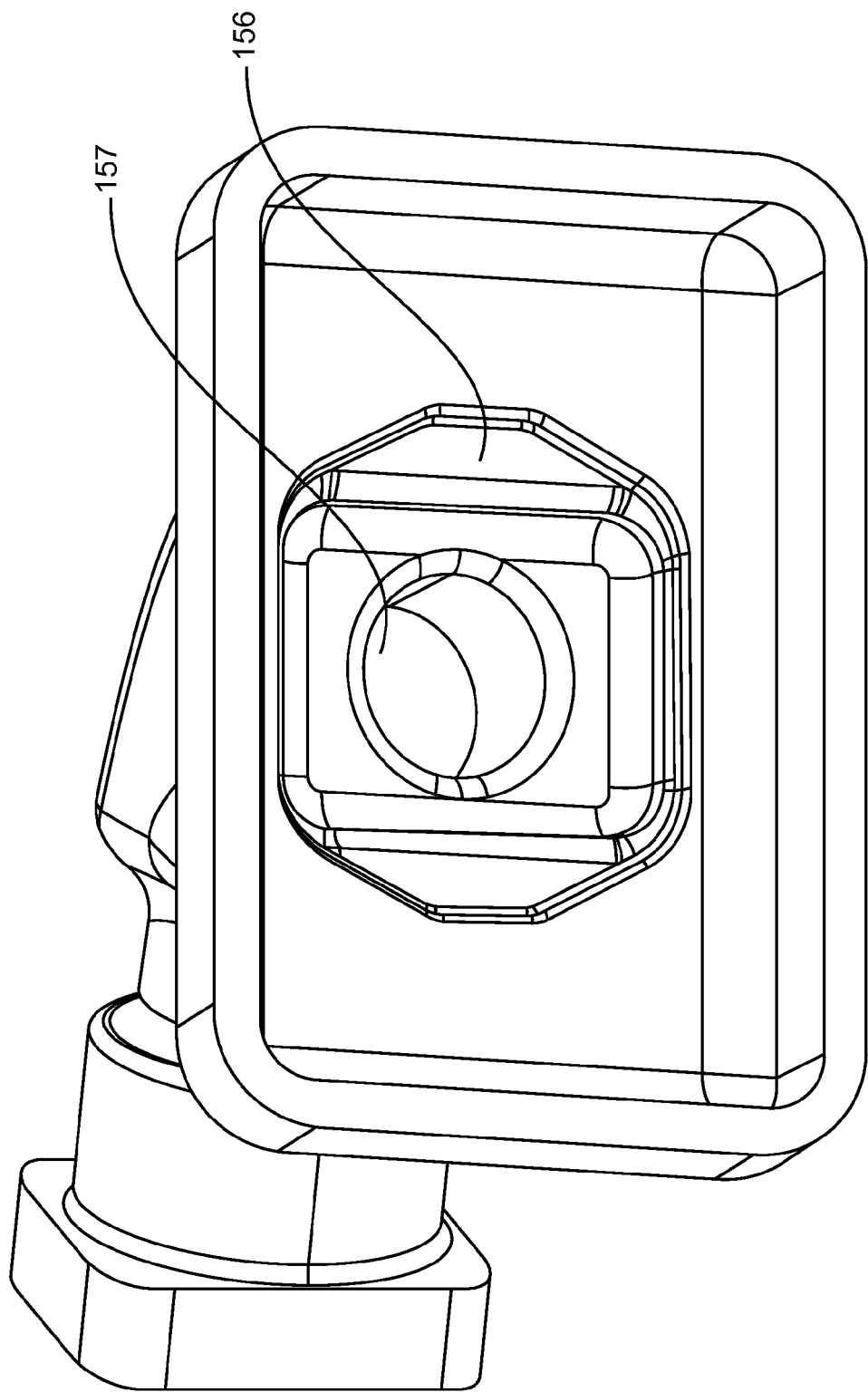
FIG. 5 shows a view of the suspension focused on the first part.

FIG. 5 shows an embodiment of the suspension 110 wherein the vibration isolator 150 contains one or more structures 156, 157 adapted to receive one or more special features of the receiver 120 to thereby ensure correct placement of the receiver 120 with respect to the vibration isolator 150. Thereby, practical and easy assembly of the receiver 120 with the suspension 110 is enabled. In an embodiment, the structures 156, 157 may be formed as recesses in the vibration isolator 150 adapted to receive substantially similar protrusions of the receiver 120.

Any of the embodiments described herein may include one or more aspects according to the below mentioned items.

Items

1. A suspension (110) for a hearing device receiver (120) comprising a first part (130) and a second part (140) and a vibration isolator (150) positioned between the first (130) and the second (140) parts and mechanically coupled to the first (130) and second (140) parts; wherein the first part (130) is adapted to at least partly enclose the receiver (120); and the second part (140) is adapted to at least partly enclose a sound outlet (160) of the hearing device (100); and wherein the vibration isolator (150) comprises an acoustic passage (151) and a damping (152) part enclosing said acoustic passage (151); and wherein the acoustic passage (151) part provides an acoustic passages between the first (130) and second parts (140); and wherein the damping (152) part of the vibration isolator (150) is asymmetrical along a longitudinal and/or a transverse axis of the vibration isolator (150); and wherein the vibration isolator (150) is freely suspended between the first and second parts.

2. A suspension according to item 1, wherein a material thickness (153) of the damping (152) part varying along the longitudinal and/or the transverse axis of the vibration isolator (150) provides the asymmetry of the damping (152) part.

3. A suspension according to item 1 or 2, wherein the damping part (152) further comprises a flexible (154) part and a substantially rigid (155) part positioned substantially intermediary between the first (130) and second (140) parts; and wherein the flexible (154) part is more flexible than the substantially rigid (155) part.

4. A suspension according to item 3, wherein the flexible (154) part is positioned between the second (140) part and the substantially rigid (155) part.

5. A suspension according to anyone of the preceding items, wherein the first (130) and the second (140) parts and the vibration isolator (150) are molded in one piece.

6. A suspension according to anyone of the preceding items, wherein the first (130) and the second (140) parts and the vibration isolator (150) are molded in an elastic material.

7. A suspension according to anyone of the preceding items, wherein the damping part is asymmetric in at least two planes.

8. A suspension according to anyone of the preceding items, wherein the damping part is asymmetric in two planes and symmetrical in a third plane.

9. A suspension according to item 8, wherein the asymmetric planes are the X-Z plane and the Y-Z plane, and the symmetric plane is the X-Y plane.

10. A suspension according to item 3 or 4, wherein the flexible (154) part comprises a transverse material thickness smaller than the substantially rigid (155) part.

11. A suspension according to anyone of the preceding items, wherein a material thickness of the damping part (152) varies asymmetrically along the longitudinal and/or transverse axis of the vibration isolator (150).

12. A suspension according to item 3 or 4, wherein the material thickness of the flexible (154) part is smaller than the material thickness of the substantially rigid (155) part.

13. A suspension according to anyone of the preceding items, wherein the acoustic passage (151) is hollow and substantially tubular, and wherein a transverse dimension of the acoustic passage in proximity to the first (130) part is smaller than the transverse dimension of the acoustic passage in proximity to the second (140) part such that the acoustic passage (151) ensures sufficient contact between the suspension (110) and the receiver (120).

14. A method of producing a hearing device (100) comprising a receiver (120) and a sound outlet (160) and a suspension (110), the suspension (110) comprising a first (130) part and a second (140) part and a vibration isolator (150) positioned between and mechanically coupled to the first (130) and second (140) parts; the vibration isolator (150) comprising a damping (152) part enclosing an acoustic passage (151); the method comprising: coupling mechanically the first (130) part to the receiver (120); and coupling mechanically the second (140) part to the sound outlet (160); such that the suspension (110) provides an acoustic passage between the receiver (120) and the sound outlet (160); and providing the damping (152) part of the vibration isolator (150) asymmetrically along a longitudinal and/or a transverse axis of the vibration isolator (150); and suspending the vibration isolator (150) freely between the first (130) and the second (140) parts.

15. A method according to item 14, wherein the asymmetry of the damping (152) part is provided by varying a material thickness (153) of the damping (152) part along the longitudinal and/or the transverse axis of the vibration isolator (150).

16. A method according to item 14 or 15, wherein the damping (152) part is further provided with a flexible (154) part and a substantially rigid (155) part; and wherein the flexible (154) part is more flexible than the substantially rigid (155) part.

17. A method according to anyone of items 14 to 16, wherein the method further comprises casting the first (130) and the second (140) parts and the vibration isolator (150) in one piece.

18. A method according to anyone of items 14 to 17, wherein the method further comprises positioning the first (130) part at a non-parallel angle to the second (140) part.

19. A hearing device (100) comprising a receiver (120) and a sound outlet (160) and a suspension (110) according to anyone of items 1 to 13, wherein the receiver (120) is mechanically coupled to the first (130) part of the suspension (110) and the sound outlet (160) is mechanically coupled to the second (140) part of the suspension (110).

Although particular embodiments have been shown and described, it will be understood that they are not intended to limit the present inventions, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A suspension for a hearing device having a receiver, comprising:
   a first part, a second part, and a vibration isolator positioned between the first and the second parts, and mechanically coupled to the first and second parts;

wherein the first part is configured to at least partly enclose the receiver;

wherein the second part is configured to at least partly enclose a sound outlet of the hearing device;

wherein the vibration isolator comprises an acoustic passage part and a damping part enclosing the acoustic passage;

wherein the acoustic passage part provides an acoustic passage between the first and second parts;

wherein the damping part of the vibration isolator is asymmetrical at least along a longitudinal axis of the vibration isolator; and wherein at least a part of the vibration isolator located between the first and second parts, and is configured to direct a vibration generated by the receiver away from the sound outlet in one or more directions; is moveable relative to the first and second parts.

2. The suspension according to claim 1, wherein a material thickness of the damping part varies along the longitudinal, along the transverse axis, or along both the longitudinal axis and the transverse axis, of the vibration isolator to thereby provide the asymmetry of the damping part.

3. A suspension for a hearing device having a receiver, comprising:

a first part, a second part, and a vibration isolator positioned between the first and the second parts, and mechanically coupled to the first and second parts;

wherein the first part is configured to at least partly enclose the receiver;

wherein the second part is configured to at least partly enclose a sound outlet of the hearing device;

wherein the vibration isolator comprises an acoustic passage part and a damping part enclosing the acoustic passage;

wherein the acoustic passage part provides an acoustic passage between the first and second parts;

wherein the damping part of the vibration isolator is asymmetrical along a longitudinal axis, a transverse axis, or both the longitudinal axis and the transverse axis, of the vibration isolator; and wherein at least a part of the vibration isolator located between the first and second parts is moveable relative to the first and second parts;

wherein the damping part further comprises a flexible part and a rigid part positioned between the first and second parts;

wherein the flexible part is more flexible than the rigid part; and wherein the vibration isolator is configured to direct a vibration generated by the receiver away from the sound outlet in one or more directions.

4. The suspension according to claim 3, wherein the flexible part is positioned between the second part and the rigid part.

5. The suspension according to claim 1, wherein the damping part is asymmetric in at least two planes.

6. The suspension according to claim 5, wherein the two planes comprise a X-Z plane and a Y-Z plane.

7. The suspension according to claim 6, wherein the damping part is symmetric in a X-Y plane.

8. The suspension according to claim 3, wherein the flexible part comprises a transverse material thickness smaller than a transverse thickness of the rigid part.

9. The suspension according to claim 1, wherein a material thickness of the damping part varies asymmetrically along the longitudinal, along the transverse axis, or along both the longitudinal axis and the transverse axis, of the vibration isolator.

10. The suspension according to claim 1, wherein the acoustic passage part comprises a tubular structure.

11. The suspension according to claim 10, wherein a first transverse dimension of the tubular structure in proximity to the first part is smaller than a second transverse dimension of the acoustic passage in proximity to the second part such that the acoustic passage can provide sufficient contact between the suspension and the receiver.

12. A hearing device having the suspension according to claim 1, wherein the hearing device further comprises:
the receiver; and
the sound outlet;
wherein the receiver is mechanically coupled to the first part of the suspension, and the sound outlet is mechanically coupled to the second part of the suspension.

13. A suspension for a hearing device having a receiver, comprising:

a first part, a second part, and a vibration isolator positioned between the first and the second parts, and mechanically coupled to the first and second parts;

wherein the first part is configured to at least partly enclose the receiver;

wherein the second part is configured to at least partly enclose a sound outlet of the hearing device;

wherein the vibration isolator comprises an acoustic passage part and a damping part enclosing the acoustic passage;

wherein the damping part of the vibration isolator is asymmetrical at least along a longitudinal axis of the vibration isolator; and wherein the vibration isolator is configured to direct a vibration generated by the receiver away from the sound outlet in one or more directions.

14. The suspension of claim 13, wherein the acoustic passage part provides an acoustic passage between the first and second parts; and
wherein the vibration isolator is freely suspended between the first and second parts.

15. The suspension of claim 13, wherein the damping part of the vibration isolator is asymmetrical along a longitudinal, a transverse axis, or both the longitudinal axis and the transverse axis, of the vibration isolator.

16. The suspension of claim 13, wherein the damping part further comprises a flexible part and a rigid part positioned between the first and second parts; and
wherein the flexible part is more flexible than the rigid part.

17. The suspension of claim 16, wherein the flexible part is positioned between the second part and the rigid part.

18. The suspension of claim 13, wherein the damping part is asymmetric in at least two planes.

19. A hearing device having the suspension according to claim 13, wherein the hearing device further comprises:
the receiver; and
the sound outlet;
wherein the receiver is mechanically coupled to the first part of the suspension, and the sound outlet is mechanically coupled to the second part of the suspension.

* * * * *